United States Patent
Birdi et al.

(10) Patent No.: US 9,313,695 B2
(45) Date of Patent: Apr. 12, 2016

(54) RADIO COMMUNICATION DEVICES, NETWORK DEVICES, METHODS FOR CONTROLLING A RADIO COMMUNICATION DEVICE, AND METHODS FOR CONTROLLING A NETWORK DEVICE

(71) Applicant: Intel Mobile Communications GMBH, Neubiberg (DE)

(72) Inventors: Roy Singh Birdi, Taufkirchen (DE); Hyung-Nam Choi, Hamburg (DE)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 13/798,627

(22) Filed: Mar. 13, 2013

(65) Prior Publication Data
US 2014/0120919 A1    May 1, 2014

Related U.S. Application Data

(60) Provisional application No. 61/719,985, filed on Oct. 30, 2012.

(51) Int. Cl.
*H04W 36/00* (2009.01)

(52) U.S. Cl.
CPC .................................. *H04W 36/0055* (2013.01)

(58) Field of Classification Search
CPC ............ H04W 36/30; H04W 36/0022; H04W 36/0083; H04W 36/06; H04W 36/08; H04W 36/14; H04W 36/18; H04W 36/20; H04W 36/24

USPC ................ 455/437, 438, 67.11, 67.13, 226.2, 455/226.3

See application file for complete search history.

(56) References Cited

U.S. PATENT DOCUMENTS

| | | | |
|---|---|---|---|
| 6,064,890 A * | 5/2000 | Hirose et al. ................... | 455/513 |
| 6,944,144 B2 * | 9/2005 | Guo et al. ...................... | 370/332 |
| 2009/0238116 A1 | 9/2009 | Chaponniere et al. | |
| 2010/0165850 A1 * | 7/2010 | Grob-Lipski et al. ........ | 370/242 |
| 2011/0014917 A1 | 1/2011 | Wager et al. | |
| 2011/0026422 A1 | 2/2011 | Ma et al. | |
| 2013/0100839 A1 * | 4/2013 | Arora et al. ................... | 370/252 |
| 2013/0201856 A1 * | 8/2013 | Chaponniere et al. ........ | 370/252 |

OTHER PUBLICATIONS

3GPP TS 25.212 V8.6.0 (Sep. 2009) 3rd Generation Partnership Project; Technical Specification Group Radio Access Network; Multiplexing and channel coding (FDD), (Release 8); 107 pages.
3GPP TS 25.214 V8.8.0 (Dec. 2009) 3rd Generation Partnership Project; Technical Specification Group Radio Access Network; Physical layer procedures (FDD), (Release 8); 93 pages.
3GPP TS 25.306 V8.9.0 (Dec. 2009) 3rd Generation Partnership Project; Technical Specification Group Radio Access Network; UE Radio Access capabilities, (Release 8); 54 pages.

(Continued)

*Primary Examiner* — Temica M Beamer
(74) *Attorney, Agent, or Firm* — Schwabe, Williamson & Wyatt, P.C.

(57) ABSTRACT

A radio communication device may be provided. The radio communication device may include a generator configured to generate a signal indicating that a radio communication network is to abort a serving cell change process.

12 Claims, 8 Drawing Sheets

(56) References Cited

OTHER PUBLICATIONS

3GPP TS 25.308 V8.9.0 (Sep. 2010) 3rd Generation Partnership Project; Technical Specification Group Radio Access Network; High Speed Downlink Packet Access (HSDPA); Overall description; Stage 2, (Release 8); 65 pages.

3GPP TS 25.331 V8.11.0 (Jun. 2010) 3rd Generation Partnership Project; Technical Specification Group Radio Access Network; Radio Resource Control (RRC); Protocol specification (Release 8); 1728 pages.

3GPP TS 25.133 V8.9.0 (Dec. 2009) 3rd Generation Partnership Project; Technical Specification Group Radio Access Network; Requirements for support of radio resource management (FDD) (Release 8); 235 pages.

DE Office Action dated Dec. 7, 2015 for Application No. 102013110976.4; 14 pages.

* cited by examiner

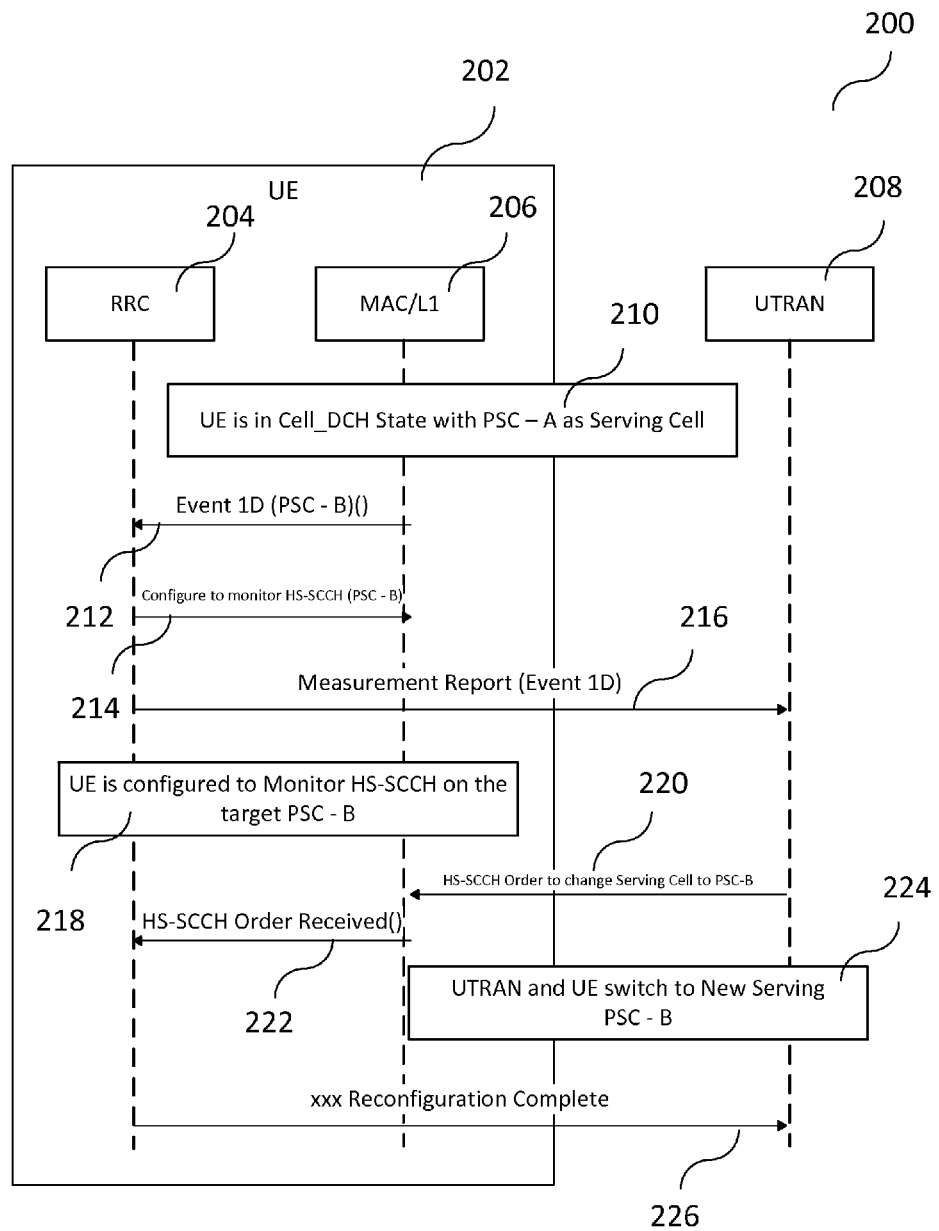

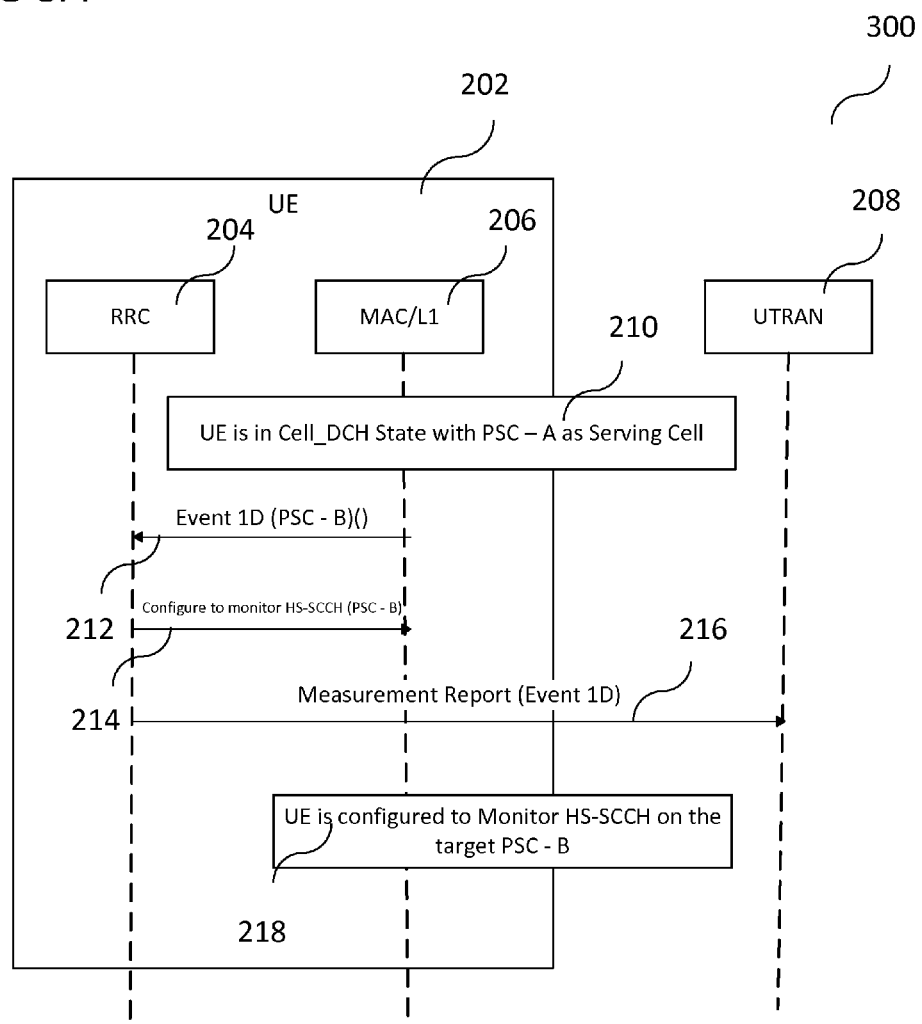

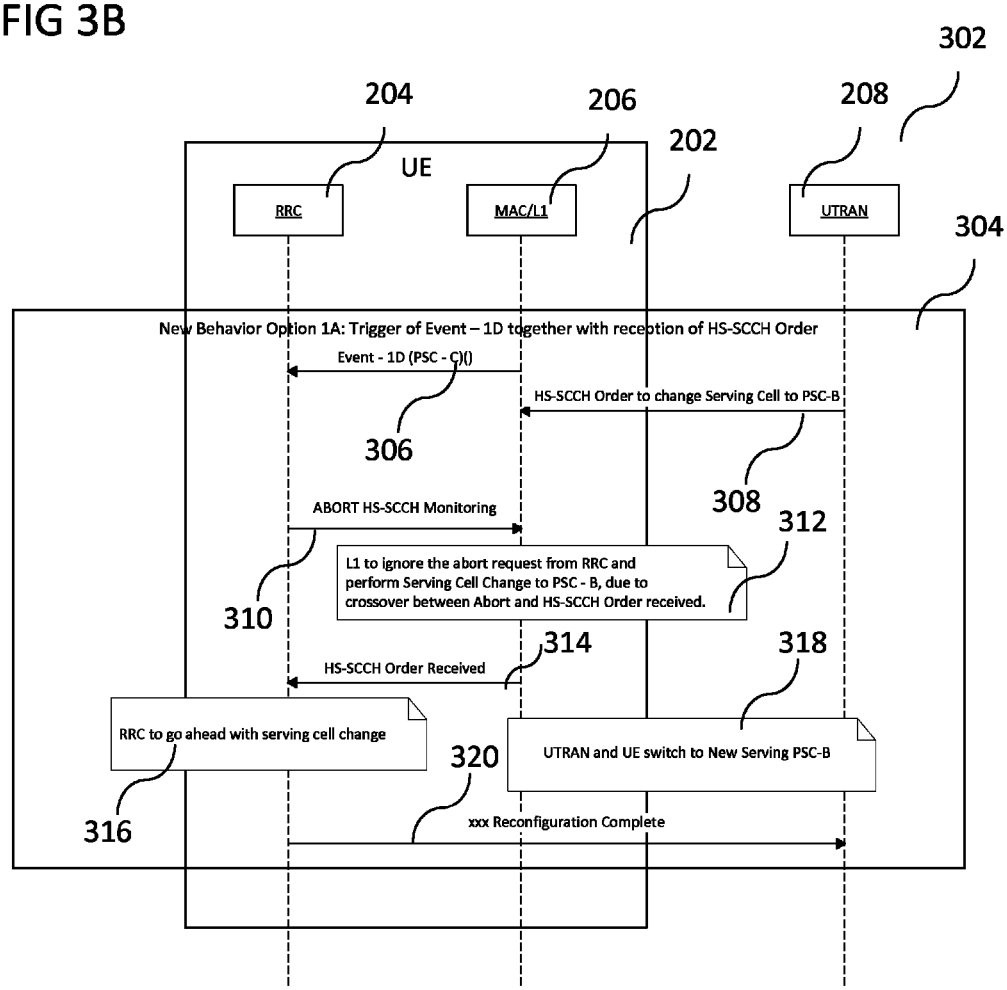

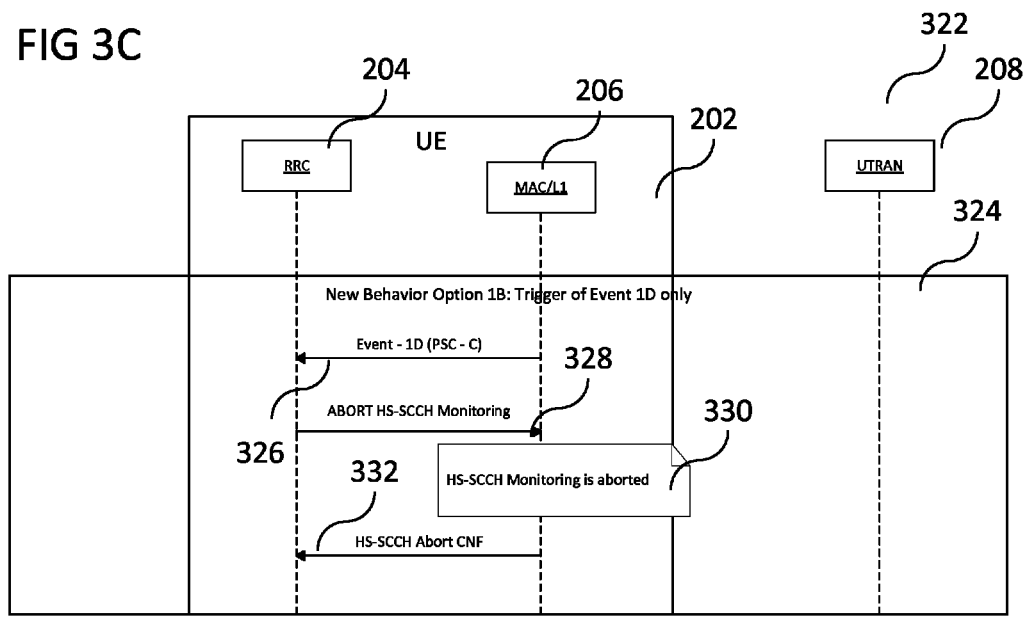
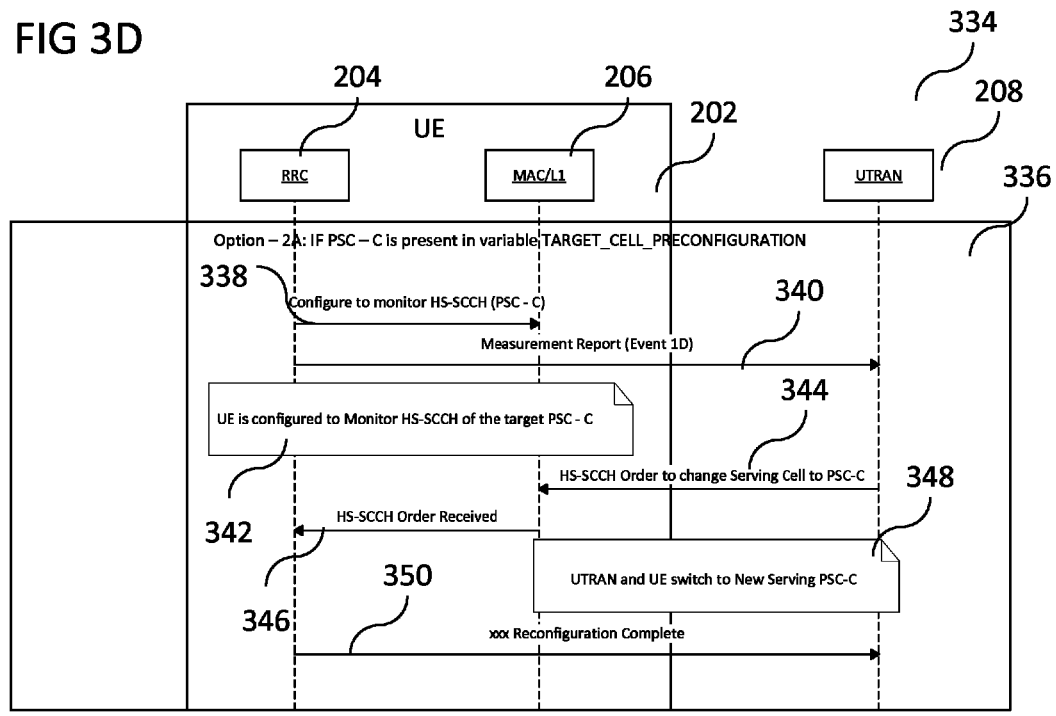

Generate a signal indicating that a radio communication network is to abort a serving cell change process Determine that the radio communication network is to abort a serving cell change process

RADIO COMMUNICATION DEVICES, NETWORK DEVICES, METHODS FOR CONTROLLING A RADIO COMMUNICATION DEVICE, AND METHODS FOR CONTROLLING A NETWORK DEVICE

CROSS-REFERENCE TO RELATED APPLICATION

This application claims priority to U.S. Ser. No. 61/719,985, which was filed Oct. 30, 2012, and is incorporated herein by reference in its entirety.

TECHNICAL FIELD

Aspects of this disclosure relate generally to radio communication devices, network devices, methods for controlling a radio communication device, and methods for controlling a network device.

BACKGROUND

Serving cell change processes may be performed by a network and a radio communication device. As long as the serving cell change processes are not complete, the radio communication device may determine that a cell different from the cell for which presently a serving cell change process is performed should be a new serving cell.

SUMMARY

A radio communication device may include a generator configured to generate a signal indicating that a radio communication network is to abort a serving cell change process.

A network device of a radio communication network may include a determiner configured to determine that the radio communication network is to abort a serving cell change process.

A method for controlling a radio communication device may include generating a signal indicating that a radio communication network is to abort a serving cell change process.

A method for controlling a network device of a radio communication network may include determining that the radio communication network is to abort a serving cell change process.

A radio communication device may include a determiner configured to determine that a radio communication network is to abort a serving cell change process.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 2 shows an illustration of an enhanced serving cell change procedure;

FIGS. 3A, 3B, 3C, 3D, and 3E show illustrations of enhanced serving cell change procedures with methods for aborting the enhanced serving cell change procedure;

DESCRIPTION

Figure 1:
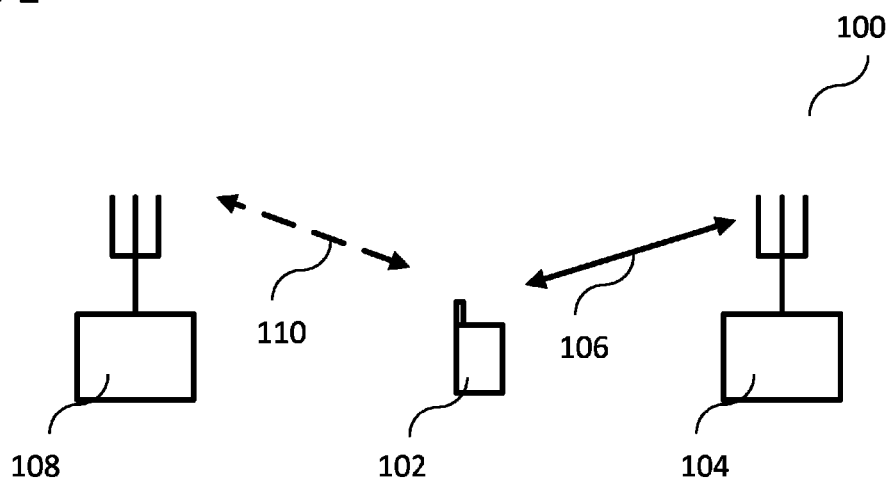
FIG. 1 shows a mobile radio communication system.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of radio communication terminal, mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

In various embodiments, a radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. The network device may include a memory which may for example be used in the processing carried out by the network device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Serving cell change processes may be performed by a network and a radio communication device. As long as the serving cell change processes are not complete, the radio communication device may determine that (or whether) a cell different from the cell for which presently a serving cell change process is performed should be a new serving cell.

Devices and methods may be provided for an improvement in an enhanced serving cell change procedure.

According to 3GPP (Third Generation Partnership Project), an 'Enhanced Serving Cell Change' mechanism in accordance with Release 8 of UMTS (Universal Mobile Telecommunications System) specifications may be provided, to solve the problem of delay in changing the serving HS-DSCH (High-Speed Downlink Shared Channel) cell and improve the reliability of serving HS-DSCH cell change especially when running a real time service over HSPA (High-Speed Packet Access).

FIG. 1 shows a radio communication system 100. The radio communication system 100 may be a cellular mobile radio communication system in accordance with UMTS, also referred to as UTRAN (UMTS Terrestrial Radio Access Network). In UMTS the UTRAN may include multiple radio network control units (also referred to a Radio Network Controller) and base stations (also referred to as NodeB). Each base station may provide radio coverage for one or more radio cells, and may be connected to a radio network control unit. Each radio network control unit may control the allocation of radio resources in the respective radio cells. Signaling and user data may be transmitted between a respective base station and a radio communication device (for example a radio communication terminal, also referred to as UE (User Equipment)) in a radio cell on the basis of a multiple access method, e.g. W-CDMA (Wideband Code Division Multiple Access) and duplexing mode, e.g. TDD (Time Division Duplexing) or FDD (Frequency Division Duplexing). The radio communication device 102 may communicate with a first radio base station 104 like indicated by a first arrow 106. The first radio base station 104 may be a serving cell for the radio communication terminal 102 for user data transmission on the HS-DSCH transport channel in downlink. The radio communication terminal 102 may further determine that (or whether) a second radio base station 108 may be used as a serving cell for user data transmission on the HS-DSCH transport channel in downlink, like indicated by a dashed second arrow 110.

FIG. 2 shows a diagram 200 illustrating an Enhanced Serving Cell Change procedure as described in Release 8 of 3GPP specifications for the FDD mode. A UE 202 may include an RRC (radio resource control) circuit 204 and a MAC (media access control)/L1 (layer 1) circuit 206. A flow of signals between the RRC circuit 204 of the UE 202 and the MAC/L1 circuit 206 of the UE 202 and the UTRAN 208 will be described.

The enhanced serving cell change process may include the following.

The UE 202 may in 210 be in RRC_state Cell_DCH in where a dedicated signaling and user data connection between the UE and UTRAN is established, and downlink user data transmission is performed on the HS-DSCH transport channel. Further, the UE 202 may maintain an active set that may include 2 cells (also referred to as radio links) as characterized by PSC-A (Primary Scrambling Code A) and PSC-C (Primary Scrambling Code C). The cell with PSC-A may be the current serving HS-DSCH Cell for downlink user data transmission on the HS-DSCH transport channel.

1. The UE 202 may trigger an measurement Event 1A (PSC-B) for addition of a new Cell with PSC-B in its active set and may send measurement reports to UTRAN.

2. On reception of Measurement Report with Event 1A, UTRAN 208 may configure the UE 202 for Enhanced Serving Cell Change by including the IE (Information Element) "Target Cell pre-configuration information" in an active set update message as a part of the newly added Radio Link for PSC-B. The IE "Target Cell pre-configuration information" may include serving HS-DSCH cell related configuration of the new cell, e.g. new UE identity, HS-SCCH configuration etc.

3. On reception of active set update with IE "Target Cell pre-configuration information", the RRC 204 in UE 202 may take the following action:

a) Store the IE "Target Cell pre-configuration information" in TARGET_CELL_PRECONFIGURATION Database;

b) Configure UE 202 for the addition of new RL (radio link).

4. After configuring UE 202 for new RL, the RRC 204 may send active set update complete message to UTRAN 208.

5. The UE 202 may have three RLs in its Active Set as PSC-A, PSC-C and PSC-B, with PSC-A as the Serving HS-DSCH Cell.

6. After some time, the UE 202 may move towards PSC-B and measurement Event-1D (change of best cell—for PSC-B) may be triggered in 212.

7. The RRC 204 may configure the UE 202 to monitor HS-SCCH of the target serving cell PSC-B in 214 and send Measurement Report with Event 1D to UTRAN in 216 by setting the IEs of Measurement Report as follows:

a) If Activation time Offset !=(not equal) 0 then
   i. Include the IE 'Activation Time' in the Measurement Report
   Else
   i. Start the Timer T324.

From this point of time, the UE 202 may be desired to monitor the primary HS-SCCH of the target cell and may be ready to receive Target Cell HS-SCCH (High Speed-Shared Control Channel) order to change the Serving HS-DSCH Cell or any reconfigurations message which may perform serving cell change in 218.

8. After this step, UTRAN 208 may send HS-DSCH Cell Change Order on Primary HS-SCCH of the Target Cell in 220. In 222, a HS-SCCH Order Received signal may be transmitted from the MAC/L1 circuit 206 to the RRC circuit 204.

9. The UE 202 may perform a successful Serving Cell Change to PSC-B in 224. In 224, also UTRAN 208 may switch to the new serving cell PSC-B.

10. The RRC 204 may send the appropriate response to UTRAN 208 depending upon Serving Cell message id.

11. The procedure may be completed at UE 202 in 226.

FIGS. 3A, 3B, 3C, 3D and 3E show illustrations of methods solving the above race condition.

Figure 3E:
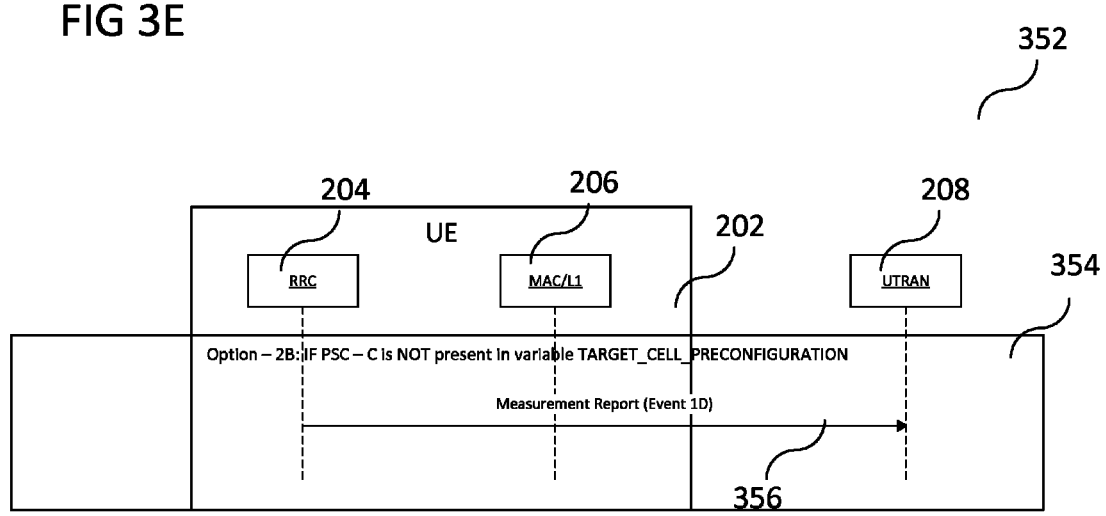

FIG. 3A shows processing similar to a first portion of processing described with reference to FIG. 2 above. The same reference signs may be used for similar or identical processing. FIG. 3B shows a flow diagram 302, 304 illustrating a processing wherein a trigger Event-1D may be received together with reception of HS-SCCH Order (which may be referred to as behavior option 1A). FIG. 3C shows a flow diagram 322, 324 illustrating a processing wherein a trigger of Event 1D only is received (which may be referred to as behavior option 1B). FIG. 3D shows a flow diagram 334, 336 illustrating a processing wherein PSC-C is present in variable TARGET_CELL_PRECONFIGURATION. This variable may indicate whether HS-SCCH reception procedures are configured for a target cell for which HS-DSCH serving Cell Change may be initiated by HS-SCCH order sent from target cell (it may be noted that this may hold true for FDD only). Details of this variable are shown in Table 1. FIG. 3E shows a flow diagram 352, 354 illustrating a processing wherein PSC-C is not present in variable TARGET_CELL_PRECONFIGURATION. It will be understood that the various processings described in FIGS. 3B, 3C, 3D and 3E may be performed subsequently or alternatively.

TABLE 1

| TARGET_CELL_PRECONFIGURATION | | | | |
|---|---|---|---|---|
| Information Element/Group name | Need | Multi | Type and reference | Semantics description | Version |
| Serving Cell Change MAC reset | OP | | Boolean | | REL-8 |
| Serving Cell Change Message Type | OP | | Enumerated (RadioBearerSetup, RadioBearerReconfiguration, TransportChannel Reconfiguration, PhysicalChannel Reconfiguration) | | REL-8 |
| Serving Cell Change Transaction Id | OP | | Integer (0 . . . 3) | | REL-8 |
| Target cell preconfigurations | OP | 1 to <maxRL> | | | REL-8 |
| >Primary scrambling code | MP | | Integer(0 . . . 511) | | REL-8 |
| >Target cell preconfiguration information | MP | | Target cell preconfiguration information 10.3.6.79a | | REL-8 |

In the above procedure, a problem may come after step 7, when the UE 202 may be monitoring the HS-SCCH of the target serving Cell (PSC-B).

At this point depending upon the measurement configuration by UTRAN, it may be possible that UE 202 may trigger a new measurement Event 1D for another cell (with PSC-C) very frequently and this may happen when previous serving cell change procedure (Event-1D) for PSC-B is not yet completed.

This may lead to a race condition and it is not specified in specification how to handle this situation.

In current 3GPP Release 8 'Enhanced Serving Cell Change' Procedure, it may not be described how UE and UTRAN should behave if UE triggers multiple Event-1D Measurements Reports ("Change of best cell"), when UE is already configured to monitor HS-SCCH of the candidate serving cell, which triggered previous Event-1D Measurement Report.

Because of this, UTRAN and the UE may take different actions which may lead to call drops and 'Enhanced Serving Cell Change' procedure will not work.

In the following, a behavior of the UE 202 will be described.

1. After Step 7 described with reference to FIG. 2 above, the UE may be waiting for a HS-SCCH order from UTRAN 208 to change serving cell or any other reconfiguration message.

2. After this step, if a new event 1D is triggered by the UE 202 for another cell PSC-C in 306, then the UE 202 may:
   a. store the Event 1D for that cell (PSC-C);
   b. abort the monitoring of HS-SCCH of PSC-B in lower layers in 310;
   c. If before aborting the UE 202 received HS-SCCH ORDER to change serving cell to PSC-B in 308 then:
      i. the lower layers may ignore the abort request in 312 and may follow HS-SCCH Order to change serving cell 314;
      ii. the UE 202 may go ahead with serving cell change to PSC-B 316;
      iii. After completion of serving cell change procedure to PSC-B in 318 and transmission of response message to UTRAN 208 in 320, the follow actions may be taken. It is to be noted that in 306, 308, and 310, the UE 202 may already be configured to monitor HS-SCCH of PSC-B, so that this may be a race condition. The RRC 204 may not know about reception of HS-SCCH order so the RRC 204 may try to abort the monitoring of HS-SCCH. FIG. 3C shows the flow of receiving the Event 1D (PSC-C) in 326, aborting the HS-SCCH monitoring in 328 and 330, and providing an HS-SCCH abort confirmation in 332 for the case wherein an HS-SCCH order is not received (unlike to the case described with reference to FIG. 3B). It may be noted that in 326 and 328 the UE 202 may already be configured to monitor HS-SCCH of PSC-B, so this may be a race condition. The RRC 204 may try to abort the monitoring of HS-SCCH.

d. If PSC-C is present in the variable TARGET_CELL_PRECONFIGURATION then i. the RRC 204 may again configure the UE 202 to monitor HS-SCCH of the target serving cell PSC-C in 338 and may send a Measurement Report-1D to UTRAN 208 in 340 by setting the IEs of Measurement Report as follows:

1. If Activation time Offset !=0 then include the IE (information element) 'Activation Time' in the Measurement Report;

2. Else starts the Timer T324.

From this point of time, in 342, the UE 202 may be desired to monitor the primary HS-SCCH of the target cell PSC-C and may be ready to receive Target Cell HS-SCCH order to change the Serving Cell or any reconfigurations message which may perform serving cell change.

ii. After this step, UTRAN 208 may send an HS-DSCH Cell Change Order on the Primary HS-SCCH of the Target Cell PSC-C in 344. The MAC/L1 circuit 206 may forward this order in 346.

ii. The UE 202 may perform a successful Serving Cell Change to PSC-C. In 348, UTRAN 208 and the UE 202 may switch to a new serving PSC-C.

iv. The RRC 204 may send the appropriate response to UTRAN depending upon Serving Cell message id in 350.

e. Else i. The UE 202 may send a Legacy Event-1D Measurement Report to UTRAN 208 in 356.

f. The procedure may be completed at UE 202.

In the following, a Network Side Behavior will be described.

1. On reception of measurement report with Event-1D, UTRAN 208 may prepare to transmit HS-SCCH order on the target PSC-B.

2. If while waiting to transmit HS-SCCH order on target PSC-B or a reconfiguration message to perform serving HS-DSCH cell change, UTRAN 208 may receive a Measurement Report with Event-1D for new PSC-C, then UTRAN 208 may abort the procedure to perform serving Cell change to PSC-B, and may follow the new Measurement Report Event-1D for PSC-C.

The devices and methods provided may provide that there is no ambiguity between UE and UTRAN behavior. This may help to increase the reliability of Enhanced Serving Cell Change procedure. As is described herein, devices and methods may be provided which clarify UE and UTRAN behavior for the problem stated above.

In another method or device, when the UE is waiting for HS-SCCH Order for serving cell change from UTRAN and new Event-1D is triggered, then the UE may delay Event 1D, a pending serving Cell Change procedure may be completed, and after pending serving cell change procedure is completed, the UE may send new Event-1D to UTRAN.

In another method or device, when the UE is waiting for HS-SCCH Order for serving cell change from UTRAN and new Event-1D is triggered, then the UE may ignore new Event 1D and may continue with pending serving cell change. However, this may lead to call drops.

Figures 4, 5:
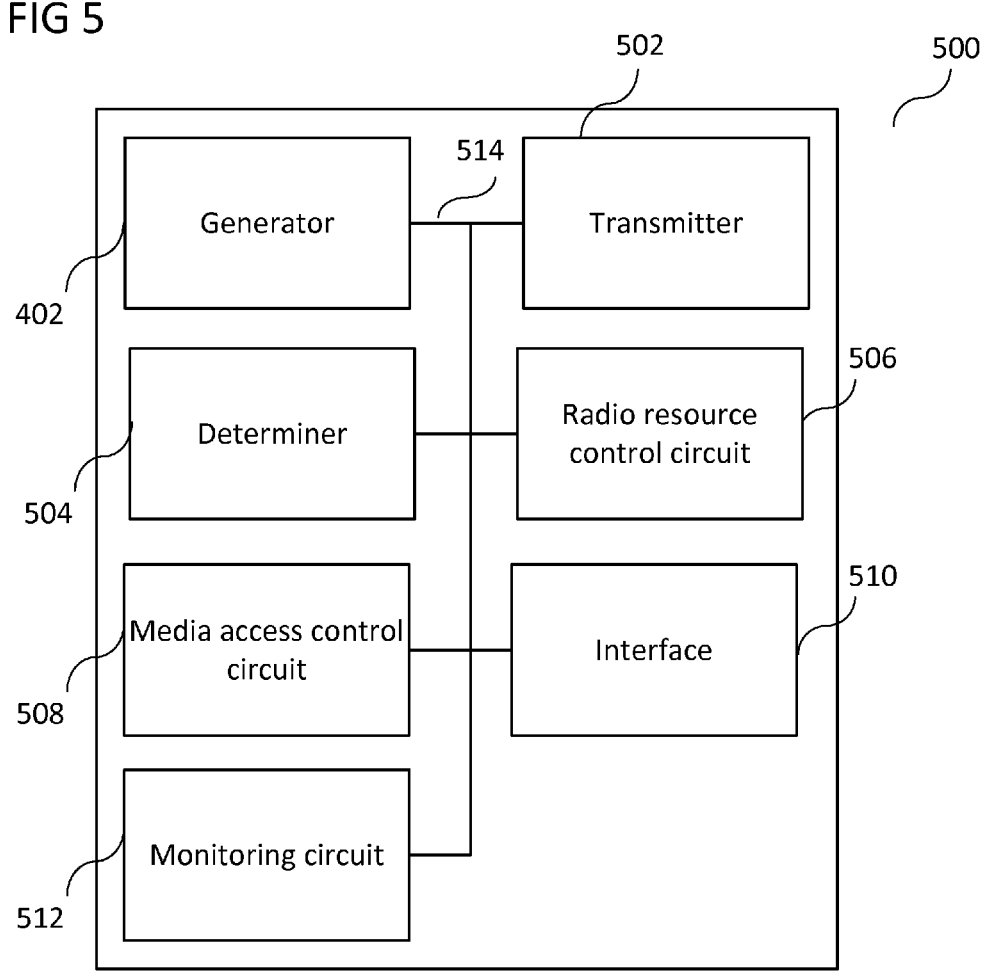
FIG. 4 shows a radio communication device with a generator.
FIG. 5 shows a radio communication device with a generator and further circuits.

FIG. 4 shows a radio communication device 400. The radio communication device 400 may include a generator 402 configured to generate a signal indicating that a radio communication network (not shown) is to abort a serving cell change process.

The radio communication device 400 may be or may include a radio communication terminal.

FIG. 5 shows a radio communication device 500. The radio communication device 500 may, similar to the radio communication device 400 of FIG. 4, include a generator 402. The radio communication device 500 may further include a transmitter 502, like will be described in more detail below. The radio communication device 500 may further include a determiner 504, like will be described in more detail below. The radio communication device 500 may further include a radio resource control circuit 506, like will be described in more detail below. The radio communication device 500 may further include a media access control circuit 508 like will be described in more detail below. The radio communication device 500 may further include an interface 510, like will be described in more detail below. The radio communication device 500 may further include a monitoring circuit 512, like will be described in more detail below. The generator 402, the transmitter 502, the determiner 504, the radio resource control circuit 506, the media access control circuit 508, the interface 510, and the monitoring circuit 512 may be coupled with each other, for example via a connection 514, for example an optical connection or an electrical connection, such as for example a cable or a computer bus or via any other suitable electrical connection to exchange electrical signals.

The transmitter 502 may transmit the signal to a cell (not shown) of the radio communication network.

The radio communication network may abort the serving cell change process when the radio communication network determines a cell as new serving cell different from the cell for which presently the radio communication network performs a serving cell change process.

The signal may include or may be a measurement report.

The radio communication network may start a new serving cell change process based on the measurement report transmitted by the radio communication device.

The serving cell change process may include or may be a process of adding a serving cell for the radio communication device 500.

The determiner 504 may determine that (or whether) a radio communication network is to abort the serving cell change process. The transmitter 502 may generate the message based on the determination. The serving cell change process may be a process of adding a cell as a serving cell for the radio communication device 500. The monitoring circuit 512 may monitor signals indicating to perform a cell change order to the cell. The monitoring circuit 512 may stop monitoring of the signals indicating to perform a cell change order to the cell based on the determination.

The serving cell change process may include or may be a process of adding a first cell as a serving cell for the radio communication device 500. The signal may include or may be an indication of a second cell different from the first cell.

The radio communication device 500 may transmit the signal from the radio resource control circuit 506 to the media access control circuit 508 via the interface 510.

Figure 6:
FIG. 6 shows a network device with a determiner.

FIG. 6 shows a network device 600 of a radio communication network. The network device 600 may include a determiner 602 configured to determine that (or whether) the radio communication network is to abort a serving cell change process.

Figure 7:
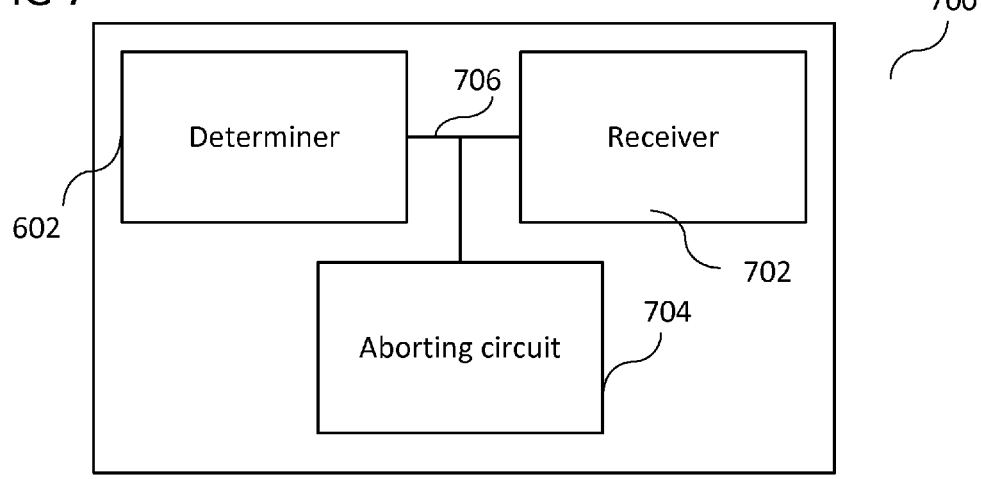
FIG. 7 shows a network device with a determiner and further circuits

FIG. 7 shows a network device 700 of a radio communication network. The network device 700 may, similar to the network device 600 of FIG. 6, include a determiner 602. The network device 700 may further include a receiver 702, like will be described in more detail below. The network device 700 may further include an aborting circuit 704, like will be described in more detail below. The determiner 602, the receiver 702, and the aborting circuit 704 may be coupled with each other, for example via a connection 706, for example an optical connection or an electrical connection, such as for example a cable or a computer bus or via any other suitable electrical connection to exchange electrical signals.

The receiver 702 may receive from a radio communication device (not shown) a signal indicating that the radio communication network is to abort a serving cell change process. The determiner 602 may determine that (or whether) the radio communication network is to abort a serving cell change process based on the received signal.

The radio communication network may abort the serving cell change process when the radio communication network determines a cell as new serving cell different from the cell for which presently the radio communication network performs a serving cell change process.

The signal may include or may be a measurement report.

The radio communication network may start a new serving cell change process based on the measurement report received from the radio communication device.

The serving cell change process may include or may be a process of adding a serving cell for the radio communication device.

The serving cell change process may include or may be a process of adding a first cell as a serving cell for the radio communication device. The signal may include or may be an indication of a second cell different from the first cell.

The network device 700 may perform a serving cell change process of adding the second cell as a serving cell for the radio communication device.

The aborting circuit 704 may abort the serving cell change process.

Figure 8:
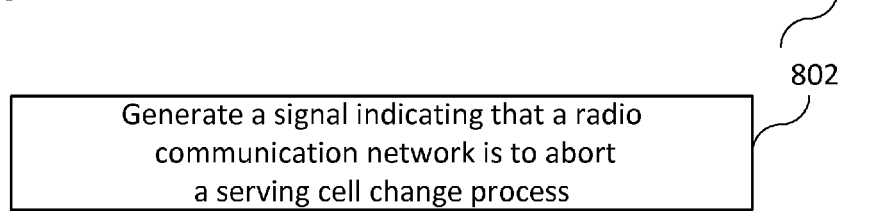
FIG. 8 shows a flow diagram illustrating a method for controlling the radio communication device of FIG. 6.

FIG. 8 shows a flow diagram 800 illustrating a method for controlling a radio communication device. In 802, a generator of the radio communication device may generate a signal indicating that a radio communication network is to abort a serving cell change process.

The radio communication device may include or may be a radio communication terminal.

A transmitter of the radio communication device may transmit the signal to a cell of the radio communication network.

The radio communication network may abort the serving cell change process when the radio communication network determines a cell as new serving cell different from the cell for which presently the radio communication network performs a serving cell change process.

The signal may include or may be a measurement report.

The radio communication network may start a new serving cell change process based on the measurement report transmitted by the radio communication device.

The serving cell change process may include or may be a process of adding a serving cell for the radio communication device.

A determiner of the radio communication device may determine that (or whether) a radio communication network is to abort the serving cell change process. The generator of the radio communication device may generate the message based on the determination. The serving cell change process may include or may be a process of adding a cell as a serving cell for the radio communication device. A monitoring circuit of the radio communication device may monitor signals indicating to perform a cell change order to the cell. The monitoring circuit of the radio communication device may stop monitoring of the signals indicating to perform a cell change order to the cell based on the determination.

The serving cell change process may include or may be a process of adding a first cell as a serving cell for the radio communication device. The signal may include or may be an indication of a second cell different from the first cell.

The transmitter of the radio communication device may transmit the signal from a radio resource control circuit of the radio communication device to a media access control circuit of the radio communication device.

Figure 9:
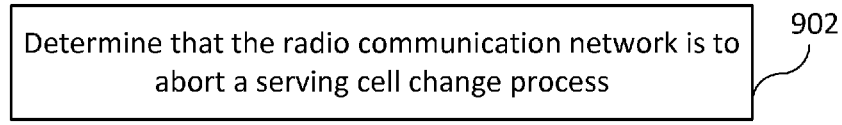
FIG. 9 shows a flow diagram illustrating a method for controlling the radio communication device of FIG. 7.

FIG. 9 shows a flow diagram 900 illustrating a method for controlling a network device of a radio communication network. In 902, a determiner of the network device may determine that (or whether) the radio communication network is to abort a serving cell change process.

A receiver of the network device may receive from a radio communication device a signal indicating that the radio communication network is to abort a serving cell change process. The determiner may determine that (or whether) the radio communication network is to abort a serving cell change process based on the received signal.

The radio communication network may abort the serving cell change process when the radio communication network determines a cell as new serving cell different from the cell for which presently the radio communication network performs a serving cell change process.

The signal may include or may be a measurement report.

The radio communication network may start a new serving cell change process based on the measurement report received from the radio communication device.

The serving cell change process may include or may be a process of adding a serving cell for the radio communication device.

The serving cell change process may include or may be a process of adding a first cell as a serving cell for the radio communication device. The signal may include or may be an indication of a second cell different from the first cell.

The network device may perform a serving cell change process of adding the second cell as a serving cell for the radio communication device.

The aborting circuit of the network device may abort the serving cell change process.

Figure 10:
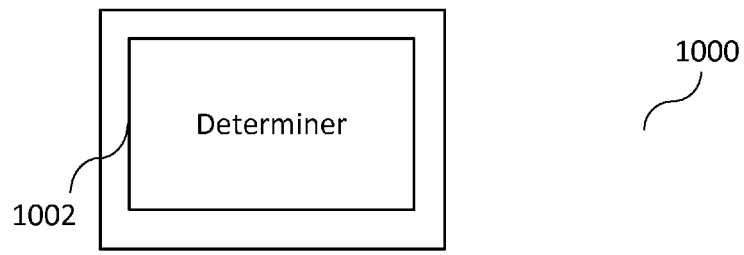
FIG. 10 shows a radio communication device with a determiner.

FIG. 10 shows a radio communication device 1000. The radio communication device may include or may be a radio communication terminal. The radio communication device 1000 may include a determiner 1002 configured to determine that a radio communication network is to abort a serving cell change process.

The serving cell change process may include or may be a process of adding a serving cell for the radio communication device.

Figure 11:
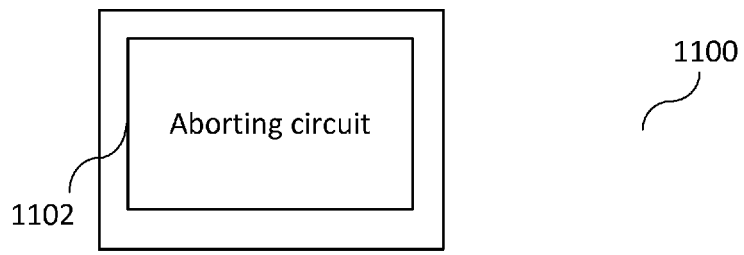
FIG. 11 shows a network device with an aborting circuit.

FIG. 11 shows a network device 1100 of a radio communication network. The network device 1100 may include an aborting circuit 1102 configured to abort a serving cell change process.

Figure 12:
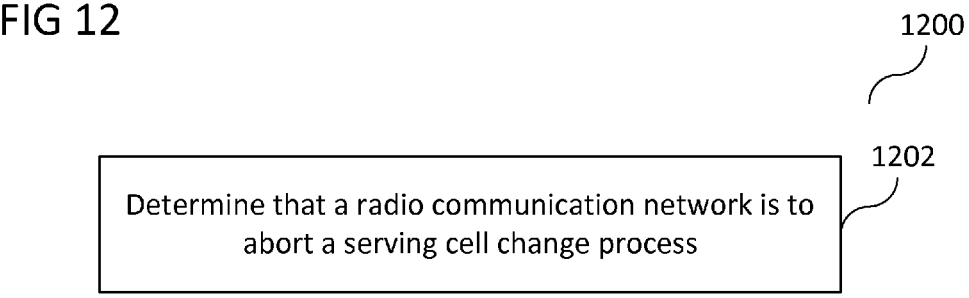
FIG. 12 shows a flow diagram illustrating a method for controlling the radio communication device of FIG. 10.

FIG. 12 shows a flow diagram 1200 illustrating a method for controlling a radio communication device. In 1202, a determiner of the radio communication device may determine that a radio communication network is to abort a serving cell change process. The radio communication device may include or may be a radio communication terminal.

The serving cell change process may include or may be a process of adding a serving cell for the radio communication device.

Figure 13:
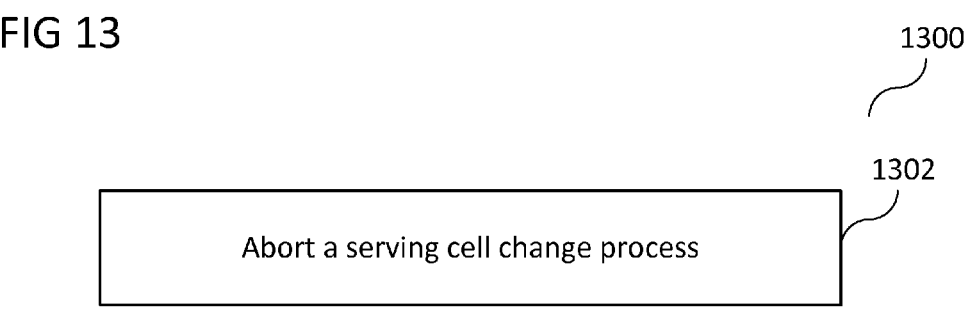
FIG. 13 shows a flow diagram illustrating a method for controlling the radio communication device of FIG. 11.

FIG. 13 shows a flow diagram 1300 illustrating a method for controlling a network device of a radio communication network. In 1302, an aborting circuit of the network device may abort a serving cell change process.

A radio communication network may include a radio communication device (for example a radio communication terminal) and a cell. It will be understood that the terms "cell" and "base station" may be used interchangeably.

A radio communication device may be provided. The radio communication device may include a monitoring circuit configured to monitor signals indicating to perform a serving cell change to a cell; a determiner configured to determine that a radio communication network is to abort a serving cell change process; a generator configured to generate a signal indicating that a radio communication network is to abort a serving cell change process; and a transmitter configured to transmit the signal to a cell of the radio communication network.

A method for controlling a radio communication device may be provided. The method may include monitoring signals indicating to perform a serving cell change to a cell; determining that a radio communication network is to abort a serving cell change process; generating a signal indicating that a radio communication network is to abort a serving cell change process; and a transmitting the signal to a cell of the radio communication network.

A network device of a radio communication network may be provided. The network device may include a receiver configured to receive a signal indicating that the radio communication network is to abort a serving cell change process; and a determiner configured to determine that the radio communication network is to abort the serving cell change process.

A method for controlling a network device of a radio communication network may be provided. The method may include receiving a signal indicating that the radio communication network is to abort a serving cell change process; and determining that the radio communication network is to abort the serving cell change process.

A network device may include one or more of the following two parts: 1. NODE-B (Base Station): may include RF, Physical (L1) and MAC (L2) layers. 2. RNC—Radio Network Controller: may include protocol RLC, RRC layers and other access stratum protocols. The processing of UE signaling messages may be done by RRC layer residing in RNC. The RRC layer of the RNC control the configuration of Node-B (Base Station) or the Cell.

Any one of the radio communication devices or network devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handyphone System), WiDEN (Wideband Integrated Digital Enhanced Network), iBurst, Unlicensed Mobile Access (UMA, also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. One or more non-transitory, computer-readable media having instructions that, when executed, cause a device to:
receive first configuration information and monitor, as part of a first serving cell change process to change a serving cell to a first target cell, a high-speed shared control channel (HS-SCCH) of the first target cell based on the first configuration information;

receive second configuration information that includes instructions to monitor, as part of a second serving cell change process, an HS-SCCH of a second target cell; and generate an abort request to abort the first serving cell change process if the second configuration information is received prior to receipt of an order to change serving cell to the first target cell.

2. The one or more non-transitory, computer-readable media of claim 1, wherein the instructions, when executed, further cause the device to:

ignore, by lower layers of the device, the abort request if an order to change serving cell to the first target cell is received after generation of the abort request but before the first serving cell change process is aborted.

3. The one or more non-transitory, computer-readable media of claim 2, wherein the instructions, when executed, further cause the device to:

complete first serving cell change process if an order to change serving cell to the first target cell is received after generation of the abort request but before the first serving cell change process is aborted.

4. The one or more non-transitory, computer-readable media of claim 2, wherein the lower layers of the device include a media access control (MAC) layer or layer 1 circuit.

5. The one or more non-transitory, computer-readable media of claim 1, wherein the instructions, when executed, further cause the device to:

abort the first serving cell change process if an order to change serving cell to the first target cell is not received before lower layers of the device receive the abort request.

6. The one or more non-transitory, computer-readable media of claim 4, wherein the instructions, when executed, further cause the device to:

monitor the HS-SCCH of the second target cell and send measurement report to the network.

7. An apparatus comprising:
a radio resource control (RRC) circuitry to:

receive first configuration information and monitor, as part of a first serving cell change process to change a serving cell to a first target cell, a high-speed shared control channel (HS-SCCH) of the first target cell based on the first configuration information;

receive second configuration information that includes instructions to monitor, as part of a second serving cell change process, an HS-SCCH of a second target cell; and generate an abort request to abort the first serving cell change process if the second configuration information is received prior to receipt of an order to change serving cell to the first target cell; and lower layer circuitry coupled with the RRC circuitry to receive the abort request.

8. The apparatus of claim 7, wherein the lower layer circuitry is to ignore the abort request if an order to change serving cell to the first target cell is received after generation of the abort request but before the first serving cell change process is aborted.

9. The apparatus of claim 7, wherein the lower layer circuitry is to process the abort request if it is received before an order to change serving cell to the first target cell is received.

10. The apparatus of claim 7, wherein the lower layer circuitry includes media access control (MAC) circuitry or layer 1 circuitry.

11. The apparatus of claim 7, wherein the apparatus is to:
abort the first serving cell change process if an order to change serving cell to the first target cell is not received before lower layer circuitry receives the abort request.

12. The apparatus of claim 7, wherein the lower layer circuitry is to:
monitor the HS-SCCH of the second target cell and send measurement report to the network.

* * * * *